(12) United States Patent
Lappalainen et al.

(10) Patent No.: US 7,708,971 B2
(45) Date of Patent: May 4, 2010

(54) METHOD FOR PREPARING CARBON NITRIDE $C_3N_4$

(75) Inventors: Reijo Lappalainen, Hiltulanlahti (FI); Lev Nicolaevich Blinov, St. Petersburg (RU); Mohammad Aref Hasan Mamakhel, Frederiksberg (DK); Sergej Nicolaevich Philippov, St. Petersburg (RU)

(73) Assignee: Carbodeon Ltd Oy (FI)

( * ) Notice: Subject to any disclaimer, the term of this patent is extended or adjusted under 35 U.S.C. 154(b) by 0 days.

(21) Appl. No.: 11/816,448

(22) PCT Filed: Feb. 9, 2006

(86) PCT No.: PCT/FI2006/000040

§ 371 (c)(1),
(2), (4) Date: Jan. 12, 2009

(87) PCT Pub. No.: WO2006/087411

PCT Pub. Date: Aug. 24, 2006

(65) Prior Publication Data
US 2009/0202419 A1      Aug. 13, 2009

(30) Foreign Application Priority Data
Feb. 16, 2005  (RU) ............................... 2005104194

(51) Int. Cl.
*C01B 21/082*  (2006.01)
(52) U.S. Cl. .................................................. 423/364
(58) Field of Classification Search ................... 423/364
See application file for complete search history.

(56) References Cited

U.S. PATENT DOCUMENTS

| 5,110,679 A | 5/1992 | Haller et al. |
| 5,606,056 A | 2/1997 | Kouvetakis et al. |
| 6,428,762 B1 | 8/2002 | Khabashesku et al. |

FOREIGN PATENT DOCUMENTS

| JP | 49048702 A | * | 5/1974 |
| JP | 2002206619 A | | 8/1990 |
| JP | 2003072003 A | | 3/1991 |
| JP | 2001059156 A | | 3/2001 |
| JP | 2002038269 A | | 2/2002 |

OTHER PUBLICATIONS

Blinov et al., Proceedings of the 8th All-Russia conference on Fundamental Investigations in Technical Universities, St. Petersburg, 2004, pp. 225-226.*
Mokhammad et al., Fiz. Khim. Stekla, 2004, 30, pp. 780.*
Blinov et al., Proceedings of the 12th International conference "High Intellectual Technologies and Knowledge Generation in Education and Science," St. Petersburg, 2005, pp. 302-305.*
International Search Report; International Application No. PCT/FI2006/000040; Date of mailing: May 17, 2006.
Written Opinion; International Application No. PCT/FI2006/000040; Date of mailing: May 17, 2006.
Arif, M. et al "Preparation of Powdered Carbon Nitride C3N4" Glass Physics and Chemistry (2004) vol. 30, No. 6; p. 573-575.
Miller, Dale R., et al "Rapid, Facile Synthesis of Nitrogen-Rich Carbon Nitride Powders" Journal of Materials Chemistry (2002) vol. 12; p. 2463-2469.
Montigaud, H., et al "C3N4: Dream or reality? Solvothermal Synthesis As Macroscopic Samples of the C3N4 Graphitic Form" Journal of Materials Science, (May 2000) vol. 35, No. 10; p. 2547-2552 (abstract only).
Ptaszynski, B. et al "Thermal Decomposition of Alkali Metal, Copper(I) and Silver(I) Thiocyanates" Thermochimica Acta (1998) vol. 319; p. 75-86.
Purdy, Andrew P., et al "Syntheses of Sublimable Carbon Nitride Materials" Main Group Chemistry (1998) vol. 2; p. 207-213.
JP 2002038269 A; published Feb. 6, 2002, Haruhiko et al; Method for Synthesizing Hard Carbon Nitride Film; English Abstract only; 1 page.
JP2002206619 A; published Aug. 16, 1990; Masayuki et al; Alkali Metal Compound of Carbon Nitride and Production Thereof; English Abstract only; 1 page.
JP2003072003 A; published Mar. 27, 1991; Masayuki et al; Pressurized Electric Conductive Metal Powder and Manufacture Thereof; English Abstract only; 1 page.
JP2001059156 A; published Mar. 6, 2001; Youzou et al; Production of Carbon Nitride Compound; English Abstract only; 1 page.
Miller, et al.; "Rapid, Facile Synthesis of Nitrogen-Rich Carbon Nitride Powders"; J. Mater Chem; 12; pp. 2463-2469; (2002).
Pozdnyako, et al.; "Mass Spectrometry of Carbon Nitride C3N4"; Technical Physics Letters; 31; 1001-1003; (2005) XP002561359.
Zhuk et al.; "Shock-Wave Loading of Amorphous Carbon Nitride in Recovery Ampoules"; High Temperature; 39; pp. 150-156; Jan.-Feb. 2001; Abstract Only, 1 page XP002467364.
EP Extended Search Report; EP 06 70 8899; PCT/FI2005000040; Client Reference BP117229/JS/BK; Date of Completion of the Search Dec. 23, 2009; Date of Mailing Jan. 11, 2010; 6 pages.

* cited by examiner

*Primary Examiner*—Wayne Langel
*Assistant Examiner*—Brittany M Martinez
(74) *Attorney, Agent, or Firm*—Cantor Colburn LLP

(57) ABSTRACT

The present invention relates to a method for preparing carbon nitride $C_3N_4$ wherein alkali metal thiocyanate is simply pyrolysed to give carbon nitride $C_3N_4$ in an efficient, economical and ecologically friendly manner. The employed starting materials are cheap and formed side products are essentially non-toxic and can be easily removed and/or washed away.

14 Claims, No Drawings

METHOD FOR PREPARING CARBON NITRIDE $C_3N_4$

FIELD OF THE INVENTION

This invention relates to a method for preparing carbon nitride $C_3N_4$ by pyrolysing alkali metal rhodanides in a simple, economical and ecologically feasible manner. Prepared carbon nitride has outstanding properties and can be used in manufacturing of electronics, manufacturing of household machinery and medical equipment, in production of blue luminophore, in spray coating of computer hard disc, manufacturing of heavy duty tools used in metal processing, etc.

STATE OF THE ART

At present, there is an actual interest in methods of production of carbon nitride by thermochemical decomposition (pyrolysis) of chemical substances or mixtures.

There is a known method of $C_3N_4$ production, which includes loading of melamine $(C_3N_3)(NH_2)_3$ and cyanuric chloride $(C_3N_3)Cl_3$ into a reactor with further heating up and generation of the end product $C_3N_4$.

The drawback (of the abovementioned method) is the fact that the method does not allow to prevent the formation of $H_2$ and HCN as by-products. This results in an elevated explosiveness and toxicity of the process; [Montigaud H., Tanguy B., Demazeau G., Alves I., Courjault S. $C_3N_4$: dream or reality? Solvothermal synthesis as macroscopic samples of $C_3N_4$ graphitic form//J. of Materials Science. 2000. V.35. P.2547-2552].

There is also a known method of synthesis of carbon nitride $C_3N_4$ [U.S. Pat. No. 6,428,762]. Powder of cyanuric chloride $(C_3N_3)Cl_3$ is mixed with powder of lithium nitride $Li_3N$, after which the mixture is placed in a reactor and sealed. Nitrogen flow is put through the reactor, the content is heated up to 300-400° C. and incubated for a certain period of time. In order to remove any byproducts, the ready made carbon nitride is cooled down and washed.

The drawbacks of the indicated method are: the process is multistage, is of high cost and gives a low yield of the end product—$C_3N_4$.

There is also a known method of $C_3N_4$ production, taken here as a prototype. [Dale R. Miller, Jianjun Wang, Edward G. Rapid facile synthesis of nitrogen-rich carbon nitride powders // J. Mater. Chem. 2002. V. 12. P. 2463-2469]. The method includes loading of thrichlormelamine $(C_3N_3)(NHCl)_3$ into a reaction chamber, after which inert conditions are ensured by a continuous flow of $N_2$ or Ar, and in the flow of this gas environment the heating up to T=500° C. is carried out. There takes place a decomposition of $(C_3N_3)(NHCl)_3 \rightarrow C_3N_{4+x} + 3HCl + (2-x)/2\ N_2)$ with generation of $C_3N_{4+x}$, where $0.5 \leq x \leq 0.8$. The gaseous by-products HCl and $N_2$ are removed with the flow of the inert gas in the (reaction) chamber. After that, the chamber is cooled down for 10 minutes, the end-product is washed with acetone and then dried at T=130° C. The method does not allow obtaining $C_3N_4$ of stoichiometric composition; moreover, it is not possible to completely remove traces of hydrogen, chlorine and oxygen from carbon nitride.

SUMMARY OF THE INVENTION

The major drawbacks of the known methods for preparing are that they are costly, hazardous processes often comprising several reaction sequences with moderate end-product yields. Moreover, the byproducts are difficult to remove and the washing processes are ineffective and time-consuming.

The invention that has now been found resolves the problems mentioned above.

The invention relates to a method for preparing carbon nitride $C_3N_4$ by pyrolysing alkalimetal rhodanides to give carbon nitride in a simple and by all means feasible manner.

Surprisingly we found that alkali metal rhodanides can be employed efficiently and in ecologically-friendly way in preparation of carbon nitride by simply pyrolysing said rhodanides. Compared to previously known methods, the yields are increased and the production costs are decreased dramatically. The production cost can be lowered by factor of 10-20 via using relatively cheap raw material and rising the yield of the ready-made end product.

The use of alkali metal rhodanide leads according to equation $4MeCNS \rightarrow 2Me_2S + C_3N_4 + CS_2$ to generation of carbon nitride $C_3N_4$ of stoichiometric composition and impurities, which do not contain toxic HCN, with the temperature gradient ensuring complete decomposition of the furnace charge and condensation of $CS_2$. Metal sulphides, which are co-produced in the reaction process, are well dissolved in water, which ensures the production of pure $C_3N_4$. As it is known, by varying the temperature ramp rates of furnace charge it is possible to obtain various structures of carbon nitride.

The pyrolysis is preferably carried out in a reactor chamber which is built of at least two connected and sealed vessels in shape. Such features allows for making the reaction process in a closed volume, which makes the whole process ecologically-friendly, ensures the high purity and the quick removal of any by-products and reduction of the $C_3N_4$ production costs.

DETAILED DESCRIPTION OF THE INVENTION

The present invention is directed to a method for preparing carbon nitride $C_3N_4$ wherein the alkali metal rhodanide is pyrolysed to give carbon nitride $C_3N_4$. With pyrolysis is here meant decomposition or transformation of a compound caused by heat.

In one preferred embodiment of the invention the alkali metal rhodanide is sodium rhodanide. In another preferred embodiment of the invention, the alkali metal rhodanide is potassium rhodanide. In a still another embodiment of the invention the alkalimetal rhodanide is lithium rhodanides. The alkalimetal rhodanide can also be a mixture of two or more alkalimetal rhodanides. The alkalimetals are not to be limited to the mentioned ones.

The pyrolysis is preferably carried out in the substantial absence of oxygen and/or hydrogen. Most preferably, the pyrolysis is carried out in complete absence of oxygen and/or hydrogen. The presence of oxygen dramatically lowers the yield of the product, and hydrogen increases the risk of explosions.

In one preferred embodiment of the invention, such conditions can be achieved by carrying out the pyrolysis in vacuumized conditions. When carrying out the pyrolysis in vacuumized conditions, the pressure can between $10^{-1}$-$10^{-9}$ mmHg, preferably $10^{-3}$-$10^{-7}$ mmHg and most preferably between $10^{-4}$-$10^{-6}$ mmHg, possibly using inert gas flow to remove gaseous impurities.

In another preferred embodiment of the invention, the pyrolysis of alkalimetal rhodanide or rhodanides is carried out under an inert gas atmosphere. Preferably, such inert atmospheres comprise nitrogen or argon.

In one preferred embodiment of the invention the pyrolysis is carried out with a gradient of $T_{max} \leq 500°$ C., $T_{min} \leq$ ambient temperature. Rising the temperature over 500° C. is in most cases not justifiable, as it may lead to partial decomposing of $C_3N_4$, therefore lowering the yield of the product. However, the scope of the invention is not restricted to said temperature gradient.

The temperature gradient is created essentially throughout the chamber. With chamber is here meant a reactor, in which the pyrolysis is carried out. In a preferred embodiment of the invention the reactor which is built of at least two connected vessels in shape. Preferably, at that at least one of the vessels is removable. In an especially preferred embodiment of the invention, the formed $CS_2$ and volatile impurities are essentially condensed in one of the vessels. The vessel containing said $CS_2$ and volatile impurities is preferably removable. In another embodiment of the invention the vessel containing carbon nitride product and alkali metal sulphide compounds is removable. Said alkali metal sulphide compounds are washed off the end product $C_3N_4$ with water.

In a still another embodiment of the invention, all vessels are removable. Naturally, the reactor comprising the vessels is so constructed that all the equipment can be tightly sealed.

EXAMPLES

The method of the invention for preparing carbon nitride $C_3N_4$ is described below, yet without restricting the invention to the examples given here. Synthetic carbon nitride $C_3N_4$ was identified using X-ray powder diffraction, infrared absorption, and reduction melting in a carrier gas (helium) flow with subsequent chromatographic separation as described in *Glass Physics and Chemistry*, 2004, 30(6), 573.

Example 1

For obtaining of carbon nitride $C_3N_4$, potassium rhodanide in quantity of 10.5271 g was taken, loaded into a reaction chamber, which was made of quartz glass and shaped as two connected vessels. The chamber was vacuumized to pressure of $10^{-4}$-$10^{-5}$ mmHg and sealed. The chamber was placed into an oven and heated up to T=500° C., making sure the temperature gradient $T_{max}$=500° C., $T_{min}$=ambient temperature through vessels. The reaction took place:

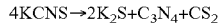

Formed $CS_2$ and volatile impurities condensed in one of the vessels due to the existence of the temperature gradient. This vessel has been removed. Potassium sulphide $K_2S$ is well dissolved in water, therefore it was removed by simple washing. As a result, carbon nitride $C_3N_4$ was obtained as a powder, yield of which was 16%.

Example 2

For obtaining carbon nitride $C_3N_4$, sodium rhodanide in quantity of 10.6321 g was taken, loaded into a reaction chamber, which was made of quartz glass and shaped as two connected vessels. The chamber was vacuumized to pressure of $10^{-4}$-$10^{-5}$ mmHg and sealed. The chamber was placed into an oven and heated up to T=490° C., making sure the temperature gradient $T_{max}$=490° C., $T_{min}$=ambient temperature through vessels. The reaction took place:

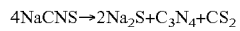

The vessel with $CS_2$ and by-product compounds was removed. Sodium sulphide $Na_2S$ is well dissolved in water; therefore it was removed by simple washing. As a result, carbon nitride $C_3N_4$ was obtained as a powder, with the yield of 15%.

If needed, a mixture of sodium and potassium rhodanides can be used for production of $C_3N_4$.

The application of a proposed method for production of carbon nitride $C_3N_4$ enables for obtaining the product in an ecologically friendly way, lowering the production cost by the factor of 10-20 via using relatively cheap raw material and rising the yield of the ready-made end product.

The invention claimed is:

1. A method for preparing carbon nitride $C_3N_4$, wherein an alkali metal rhodanide is pyrolysed to give carbon nitride $C_3N_4$.

2. A method according to claim 1, wherein the alkali metal rhodanide is sodium rhodanide, potassium rhodanide, lithium rhodanide or a mixture of two or more rhodanides.

3. A method according to claim 1, wherein the pyrolysis is carried out in the substantial absence of oxygen and/or hydrogen.

4. A method according to claim 3, wherein the pyrolysis is carried out in vacuumized conditions.

5. A method according to claim 4, wherein the pressure of the vacuumized conditions is between $10^{-1}$-$10^{-9}$ mm Hg.

6. A method according to claim 3, wherein the pyrolysis is carried out under an inert gas atmosphere.

7. A method according to claim 6, wherein the inert gas atmosphere comprises nitrogen.

8. A method according to claim 6, wherein the inert gas atmosphere comprises argon.

9. A method according to claim 1, wherein the pyrolysis is carried out with a gradient of $T_{max}$ less than or equal to $\leq$500° C., and $T_{min}$ less than or equal to $\leq$ambient temperature.

10. A method according to claim 9, wherein the temperature gradient is created essentially throughout the chamber.

11. A method according to claim 1, wherein the pyrolysis is carried out in a reactor comprising at least two operably connected vessels.

12. A method according to claim 11, wherein at least one of the vessels is removable.

13. A method according claim 11, wherein formed $CS_2$ and volatile impurities are essentially condensed in one of the vessels.

14. A method according to claim 13, wherein the vessel containing formed $CS_2$ and volatile impurities is removable.

* * * * *